United States Patent [19]

Yerushalmi

[11] Patent Number: 5,102,453
[45] Date of Patent: Apr. 7, 1992

[54] ALUMINUM DROSS RECOVERY PROCESS

[76] Inventor: Dan Yerushalmi, 2247 Chestnut Hills, Cleveland, Ohio 44106

[21] Appl. No.: 713,783

[22] Filed: Jun. 12, 1991

[51] Int. Cl.$^5$ .............................................. C22B 21/00
[52] U.S. Cl. ..................................................... 75/416
[58] Field of Search ................................. 75/672, 416

[56] References Cited

U.S. PATENT DOCUMENTS 4,073,644 2/1978 Papafingos ........................... 75/672

Primary Examiner—Peter D. Rosenberg
Attorney, Agent, or Firm—D. Peter Hochberg; Mark Kusner; Louis J. Weisz

[57] ABSTRACT

A method for recovering reusable materials from aluminum dross is disclosed comprising crushing the dross and extracting solubles therefrom with water in a digester. The brine so obtained is processed in a crystallizer to obtain fluxing materials contained therein, and the insolubles are furnaced to separate the free aluminum metal therefrom. To prevent undesirable reactions from occurring in the digester which result in the production of hazardous and noxious products, the pH in the digester is controlled below about 8, and preferably above about 5, by withdrawing a magnesium chloride-containing stream from the crystallizer and introducing it into the digester.

12 Claims, 1 Drawing Sheet

ALUMINUM DROSS RECOVERY PROCESS

TECHNICAL FIELD

This invention relates to a method for processing aluminum dross to recover reusable materials therefrom. More particularly, this invention relates to a process for reclaiming reusable materials from secondary and tertiary dross containing high sodium, potassium and magnesium levels therein a way that reduces, if not substantially emliminates the need for landfill disposal of wastes associated with the recovery process. Specifically, this invention relates to aluminum dross recovery process in which a magnesium chloride-containing stream taken from a later stage in the process is recycled back to the point in the process at which chemical reactions promoting hazardous conditions occur and is introduced as a pH control, thereby minimizing such reactions without any need to increase the overall amount of magnesium chloride contained in the system.

BACKGROUND OF THE INVENTION

During the smelting of aluminum scrap such as aluminum house siding, castings, beverage cans and the like to recover aluminum therefrom, large quantities of salt fluxing compounds comprising sodium and potassium chlorides and fluorides, are added to the smelting furnaces. Such compounds are also added to furnaces employed during the smelting of aluminum dross during the process of recovering additional aluminum values therefrom. Such fluxing compounds combine with the aluminum oxide present in the furnace melt, and being lighter than the molten aluminum float to the top of the melt, forming a dross which is readily removed from the melt by skimming.

Inasmuch as the dross contains a number of valuable components, including but not limited to aluminum, and further, in view of the fact that the disposal of the dross in an environmentally responsible fashion entails undersirable expense, it has become advantageous to treat the dross, and to recover resusable components therefrom to the extent possible. Such a procedure not only salvages valuable materials, but importantly, the amount of material that must be disposed of, for example in an expensive landfill operation, is dramatically reduced.

In the past, a number of methods have been proposed and utilized for treating aluminum dross, some of them being relative primitive. One such procedure, for example, simply involves crushing and concentrating the dross in a suitable impact mill and melting the fragmented concentrate in a furnace where the aluminum present is freed from the dross as molten metal, the balance being discarded.

A still different method entails crushing the dross and leaching the fragmented material on a continuous basis to recapture the fluxing salts contained therein, the insoluble balance of the material being furnaced as previously described.

In some instances the dross has even been disposed of in a landfill without any attempt to recover contained reusable components including, for example, the sodium and potassium chloride "salt cake", one of the products discharged from the smelting furnaces.

A more sophisticated method of dross treatment involves the method described in co-pending application Ser. No. 451,298, filed Dec. 15, 1989, entitled "Process for the Recovery of Values from Secondary Aluminum Dross", and continuation applications based thereon, directly or indirectly in the process there disclosed, after being crushed, the reduced particles are screened, the fines being sent to a screw classifier where they are digested with water. Solids remaining after classification treatment are dried, thereby transforming them into a useful product. Water from the classifier is processed to recover the flux salts therefrom.

The coarse material from the screening process is sent to a digester, treated with water, with thereafter wet screened. The insolubles from the screening are fed to a dryer and separated into coarse solids or "concentrate" which is sent to a furance for removal of aluminum as molten metal. The fine material is combined with solids discharged from the dryer used to process material leaving the screw classifier previously referred to.

The soluble-rich, semi-liquid stream leaving the wet screening operation is also treated in a screw classifier; the solids therefrom being combined with the dryer feed from the first-mentioned classifier. The liquids leaving the two classifiers are also combined, and the fluxing salts removed therefrom. While the process described offers considerable advantages over the other methods, outlined, it is not without certain disadvantages.

In this regard, it has been found, for example, that in the course of digestion of the coarse fragments produced in the crushing operation, especially the digestion of beverage can dross including associated salt cake, a number of underisable and potentially and potentially hazardous reactions take place in the presence of water. For instance, some of the aluminum compounds unavoidably present in the dross combine to form dangerous and noxious products. For example, free aluminum in the dross can combine with the water in the digester to form explosive hydrogen. Aluminum nitride present combines with the water to form poisonous and flammable ammonia. Aluminum carbide in the dross can result in explosive methane, while contained aluinum phosphides react to yield the toxic and flammable phosphine. In addition, aluminum sulfide in the dross produces flammable and toxic hydrogen sulfide.

Furthermore, not only do the substances formed by the reactions mentioned present a hazard in the workplace and risk the contravention of laws governing workplace conditions, but some of the aluminum present is coverted to unwanted aluiminum oxide, $Al_2O_3$, representing an economic loss to operators of the process.

It has been found, however, that where the hydrogen-ion concentration, pH, of the digestion mixture is kept below about 8, the undesirable reactions described are suppressed. While the magnesium chloride, also present as a contaminant in the dross, helps to maintain the pH in the digester below the value mentioned, unfortunately it has a tendency to precipitate from solution as magnesium hydroxide during digestion, a physical state in which it is unable to function as a pH control.

Prior to the invention described herein, introduction of a recycle stream having a substantial magnesium chloride content has not previously been used to control pH in a dross digestion mixture. This is not surprising, given the fact that the presence of magnesium chloride, particularly that resulting from the smelting of used aluiminum beverage cans whcih contain more than 1% by weight of magnesium, presents a problem in dross processing, especially when a wet dross reclamation process is employed.

In this regard, while ordinary aluminum scrap contains only about 0.1%, by weight, of magnesium, beverage cans, which require stiffened lids, necessitate the use of a magnesium-containing aluminum alloy, i.e., one including from about 1.5% to about 5.6%, by weight of magnesium. Furthermore, the magnesium chloride present in the portion of the dross solubilized during the digestion produces a boiling point elevation and crystallizes at a significantly higher temperature than does the sodium chloride and potassium chloride present. Consequently, in that part of the process in which the metal flux salts are recovered by evaporative crystallization, the temperature of the evaporator gradually rises as the magnesium chloride in the crystallizer liquor becomes more concentrated, the rise in temperature eventually causing disruption of the crystallization operation.

pH control in the digester achieved through the incorporation of magnesium chloride extraneous to the recovery system is undesirable for the reason that it increases the overall amount of magnesium contained in the unrecoverable material derived from the process. Such material must eventually be disposed of, commonly in a landfill, and although this primarily non-metallic product, NMP, is placed in plastic film-lined, protected landfills, some water eventually penetrates the liners and can react with the magnesium present, resulting in an exothermic reaction which melts the plastic. The balance of the NMP is thereafter readily accessible to water, which leaches it, the resulting solution being free to enter the environment, particularly the ground water, where it results in unacceptably high chloride levels.

BRIEF DESCRIPTION OF THE INVENTION

In view of the preceding, therefore, it is a first aspect of this invention to provide a process for recovering secondary and tertiary aluminum dross.

A second aspect of this invention is to provide a process for recovering aluminum dross containing relatively high concentrations of magnesium chloride.

Another aspect of this invention is to provide a process for recovering aluminum dross that minimizes unwanted side reactions in the recovery system's digester.

A further aspect aspect of this invention is to provide a process for recovering aluminum dross that reduces the amount of material remaining from the recovery process that must be disposed of in a landfill operation.

An additional aspect of this invention is to avoid the addition of extraneous magnesium chloride to the recovery system.

A still further aspect of the invention is to eliminate toxic, flammable and exlosive material from the workplace, and from the environment.

Yet another aspect of this invention is to provide a method for controlling pH in the digester of aluminum dross recovery process by introducing a magnesium chloride-rich purge stream from the crystallizer section of the recovery system back into the digester.

The preceding and additional aspects of the invention are provided by a process for recovering reusable materials from aluminum dross that contains fluxing, magnesium and aluminum-containing compounds, as well as aluminum metal. The process comprises the steps of crushing the dross; treating the crushed dross in a digester vessel with water to dissolve water-soluble compounds contained therein; separating an aqueous solution of the soluble compounds thus obtained from insolubles; furnacing the insolubles to obtain aluminum metal, and evaporating the aqueous solution of soluble compounds in an evaporator to crystallize and recover fluxing compounds therefrom. The improvement contemplated by the invention comprises the recycling of part of the magnesium chloride-containing evaporator liquor back to the digester vessel to control the pH of the vessel's contents, thereby suppressing unwanted reactions.

The preceding and other aspects of the invention are provided by a process for recovering reusable materials from aluminum dross comprising the steps of crushing the dross; treating the crushed dross in a digester vessel with water to dissolve water-soluble compounds contained therein; separating an aqueous solution of fluxing compound-containing solubles from insolubles in the slurry leaving the digester; furnacing the insolubles to obtain aluminum metal; treating the aqueous solution in a crystallizer to crystalize the fluxing compounds therefrom, and drying the crystallized fluxing compounds in a dryer. The invention comprehends the withdrawal of a stream magnesium chloride-containing liquor from the crystallizer which is recycled back to the digester vessel. Commonly, a further stream is withdrawn and fed to the dryer.

The preceding and still additional aspects of the invention are provided by a process for recovering reusable materials from aluminum dross that includes fluxing, magnesium, and aluminum-containing compounds and aluminum metal. The process comprises the steps of crushing the dross; treating the crushed dross in the digester vessel with water to dissolve water-soluble compounds contained therein; separating an aqueous solution of fluxing compound-containing solubles from insolubles in the slurry leaving the digester; furnacing the insolubles to obtain molten aluminum metal; treating the aqueous solution in a crystallizer to crystallize the fluxing compounds therefrom, and drying the crystallized fluxing compounds in a dryer. The invention involves the removal of two streams of magnesium chloride-containing liquor from the crystallizer, one being recycled to the digester vessel in an amount sufficient to control to pH of the material in the digester vessel at no more than about 8, and the other being fed to the dryer.

BRIEF DESCRIPTION OF THE DRAWING

The invention will be better understood when reference is had to the accompanying FIGURE, which is a schematic flow diagram of the aluminum dross recovery process of the invention.

DETAILED DESCRIPTION OF THE INVENTION

Figure 1:
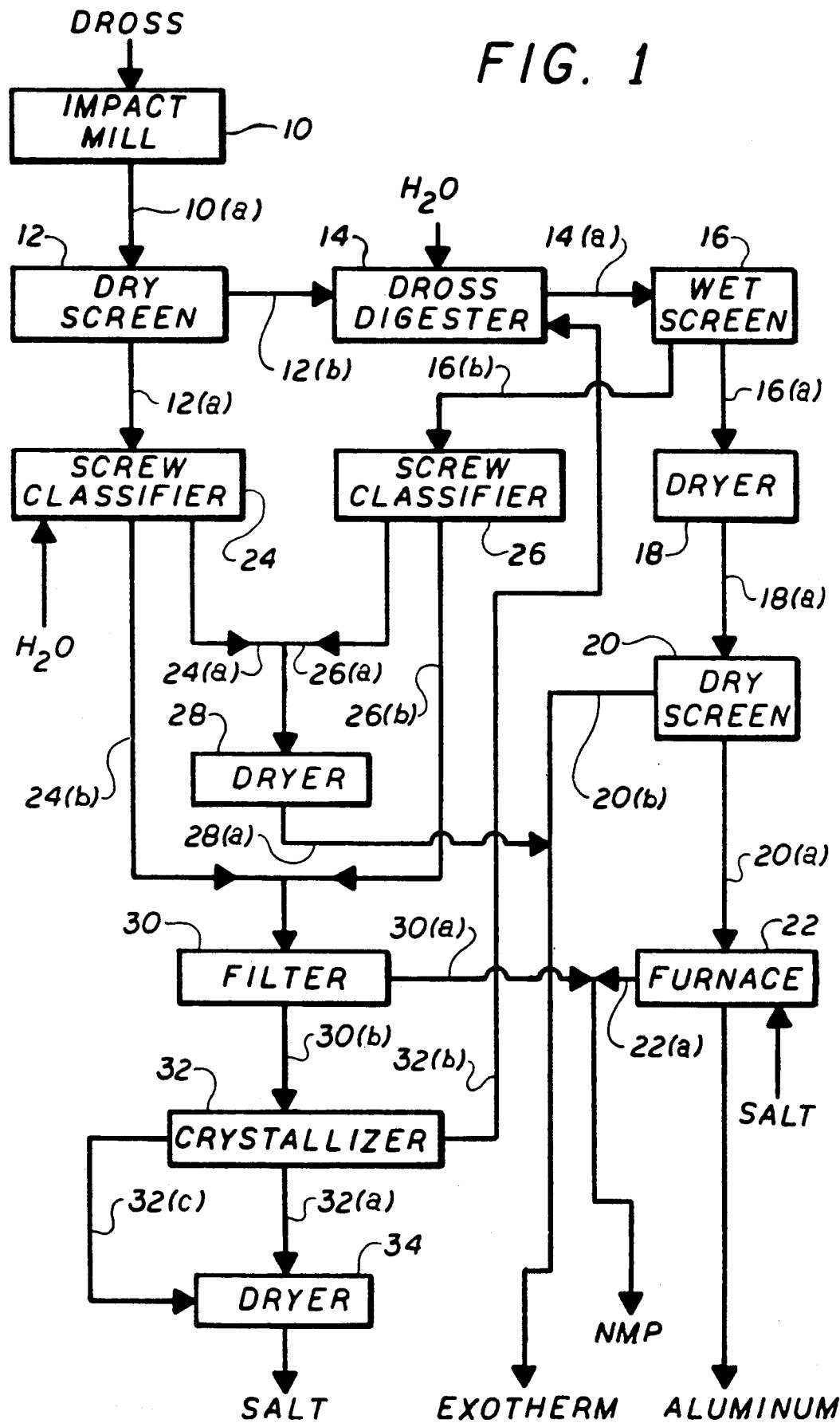

Secondary aluminum dross of the type contemplated by the invention described herein consists of dross recovered from processes in which aluminum scrap has been melted to prepare reusable metal in the form of aluminum ingots, while tertiary aluminum dross consists of dross recovered from furnaces employed in recovering the secondary dross, both materials, being sometimes referred to herein as "dross". Such dross is to be distinguished from dross produced in the process of preparing the original metal by electrolytic means. Although useful in any secondary or tertiary dross leaching-type recovery process such as the one described herein, the invention is particularly useful in the recovery of aluminum dross containing large amounts of magnesium chloride, for example, that derived from the reclamation of used beverage cans. In this regard, beverage cans must have stiffened lids if the pull tabs commonly employed for opening them are to be operable. Such stiffness requires the use of high-magnesium content aluminum alloys for their fabrication; consequently, the invention is particularly applicable to dross obtained from recycled beverage cans which contains large amounts of magnesium chloride for the reasons mentioned.

Depending upon its source, and on a wieght basis, secondary dross will contain 10% to 25% aluminum; 35% to 45% fluxing material, and 35% to 45% floxing material, and 35% to 45% aluminum oxide. The fluxing material commmprises substantially equal weight amounts of sodium chloride and potassium chloride, since a eutectic mixture is formed in that ratio which melts at about 1384° F., compared to 1474° F. for the sodium salt, and 1422° F. for the potassium salt. The use of the eutectic allows minimal super-heating of the aluminum, which melts at about 1220° F., to reduce the flux to its operable molten condition.

The process results in the recovery of the flux salt in substantially the eutectic ratio, a form in which it can be re-used for fluxing purposes, as well as of pure aluminum. Also recovered is a product comprising a high proportion of aluminum metal fines and aluminum oxide, known in the industry as "exotherm", which is useful as an exothermic topping in steel manufacture because of its heat-producing and heat-retention characteristics.

The remaining product of the process is the non-metllic NMP, which is typically disposed of in a landfill operation.

Referring now to the FIGURE, the dross is initially processed through a crusher, for example, a ball mijll or equivalent device 10, where the received dross is fragmented. The reduced fragments 10(a) are then passed over a screen 12 where size classification of the fragments is carried out. Commonly, at least two fractions are produced, one containing fines, typically below −10 mesh. The other fraction, usually representing up to 80% of the crushed material and known as "middlings", ranges from about −4 to +10 mesh. Pieces larger than four inches can serve as furnace feed without further processing, provided they contain sufficient aluminum content; otherwise, they are recycled to the crusher 10.

Each of the streams, the fines and the middlings, are processed separately in order to maximize recovery of the aluminum content thereof.

The middling stream 12(b) is fed to a dross digester 14 to which water is introduced. The digester can be any suitable vessel capable of holding the dross middlings and the water introduced therein for purpose of leaching the dross solubles. However, it has been found advantageous to employ agitated mixers of the type normally carried on concrete trucks since they are readily available and relatively inexpensive, besides possessing the necessary physical characteristics to carry out the leaching operation.

In order to suppress the reactions previously referred to so as to minimize the unwanted production of ammonia, methane, hydrogen, hydrogen sulfide and other noxious products, the leaching operation is carried out in digester 14 at a pH below about 8. In addition, and preferably, the pH is controlled above 5 since below that figure, the digester contents are so acidic that severe corrosion of the equipment is produced.

While the magnesium chlride naturally present in the dross would, in the normal course of the digestion, be sufficient to restrain the pH of the digester contents from rising, some of the magnesium chloride is converted to magnesium hydroxide, which being insoluble, is precipitated from solution. Thus, the contents of the digester become more basic, a condition which favors the creation of still more of the hydroxide, reinforcing the tendency of the digester contents to become so basic that the unwanted reactions referred to are promoted, rather than eliminated.

To avoid the overly-basic condition, it has been found that the introduction into the digester of magnesium chloride containing liquor from the evaporator-crystallizer 32, which shall be described in greater detail in the following, can maintain the pH in the range of from about 5 to about 8 without the addition of extraneous magnesium chloride to the system, the disadvantage of which has already been described. In carrying out the pH adjustment, samples of the digester's contents are periodically subjected to pH analysis and evaporator liquor 32(b) is added, as required, to maintain the pH of the digester in the desired range. Digestion times will vary, depending upon the character of the dross being treated; normally however, the digestion will last from about twenty minutes to one hour.

Following solution of the solubles in the digester 14, its contents 14(a) are fed as a slurry to a wet screening operation with a wet screen 16 which divides the digested materials into one fraction containing coarse particles, for instance, +20 mesh, and a stream of fine particles of about −20 mesh. The coarse particles 16a, which contain a relatively high metallic aluminum content and some aluminum oxide are sent to a dryer 18, which may be a rotary drum dryer, where the material is dried. The dried material 18(a) is then passed to a dry screen 20 where the material is divided into a coarse fraction of about +8 mesh, and a fines fraction approximately −8 mesh. The coarse fraction 20(a) is passed to a furnace 22, where the material is covered with a layer of flux salt, which acts as an insulating layer, and heated to a temperature sufficient to melt the free aluminum present, the metal then being tapped from the furnace and cast into aluminum ingots. The balance of the material 22(a) constitutes non-metallic product which is removed from the furnace and may be disposed of in a landfill.

Referring again to the wet screening operation at wet screen 16, the fines there obtained are removed as a slurry 16(b), rather than being furnaced, so that any aluminum present in the fines does not combine with oxygen in the furnace to produce unwanted aluminum oxide.

The slurry 16(b) is sent to a screw classifier 26, solids 26(a) from the classifier then being fed to a dryer 28, for example, of the rotary drum type, where they are dried and forwarded as exotherm product 28(a) to storage.

Again referring to dry screen 12, the fines 12(a) therefrom are fed to a screw classifier 24 and combined with water therein, the classifier in effect functioning as an additional digester. It is unnecessary to control the pH in the classifier 24 since the solids entering the classifier contain minimal aluminum, and therefore, the unwanted side reactions referred to are not a serious problem. The amount of water introduced into classifier 24 is deliberately maintained at a minimum, as is the water added to dross digester 14, in order to reduce the amount of water that must ultimately be removed in the crystallization operation described in the following. The solids 24(a) discharged from classifier 24 are also fed to dryer 28 and the resulting exotherm product sent to storage.

The liquids 24(b) and 26(b) leaving the classifier 24 and 26, respectively, are processed in a filter 30, which may be a rotary drum filter employing diatomaceous earth as a filter aid, or it may be some other type of filter such as a filter press, or an equivalent of the preceding. The solid cake obtained from the filter 30(a) after being discharged therefrom is sent to a landfill as non-metallic product. Suppression of the unwanted reactions referred to in connection with the dross digester 14 has a further beneficial affect in that it permits filter 30 to operate at lower temperatures, and thus more satisfactorily than would otherwise be the case. The liquid 30(b) from the filter is introduced into a crystallizer 32 where the water is evaporated and the flux salts crystallized.

A portion of the liquor in the crystallizer 32 is transferred as a side stream 32b, normally containing about 8% to 9%, by weight, of magnesium chloride back to the dross digester 14 to act as a pH control, as previously described. The crystallizer may be any one of the many types available in the market; however, it has been found that a forced circulation evaporator with mechanical vapor recompression provides beneficial operating advantages in the process, and its use is preferred.

The crystallizer normally operates at a temperature of about 235° F. to 236° F., a temperature at which the flux salt gradually precipitates from solution. Were it not removed, however, the continual addition of the magnesium chloride contained in the brine fed to the crystallizer would raise the boiling point of the liquor and result in the temperature of the crystallizer rising, for example, to about 243° F., a point at which the magnesium chloride would then also precipitate from solution. Such a temperature, however, would result in problems being experienced with the crystallization operation, among other things, due to the fact that the high temperature would cause shutdown of the compressor used in conjunction with the crystallization system. This difficulty is overcome, however, not only by removal of the magnesium chloride stream 32(b) recycled to the dross digester 14, but also by a further side stream 32(c) removed from the crystallizer. Preferably in this regard, the magnesium chloride present in the crystallizer is controlled by withdrawal of such streams in amounts such that the magnesium chloride present in the crystallizer does not exceed about 8% to 9% on a weight basis, a concentration at which the temperature of the crystallizer can be maintained at about 235° F. to 236° F. The fluxing salts 32a recovered from the crystallizer 32 are sent to a dryer 34 where the salts are dried and forwarded to storage. The stream 32(c) from the crystallizer also discharges into the dryer, the magnesium chloride thereby being removed from the system, or it can otherwise be disposed of.

In summary, and while the numbers will vary depending upon the nature of the dross being processed, non-metallic product produced by the process of the invention can be as low as 39% of the total dross processed, compared to significantly greater percentages produced in other prior art processes. This is reflected in the fact that whereas the process of the invention employs only about 20 pounds of flux per 100 pounds of aluminum recovered, some prior art processes consume as much as 110 pounds of flux per 100 pounds of aluminum. From the preceding, it will be appreciated that not only are the landfill requirements for the process of the invention considerably reduced, but the material which is landfilled is much less likely to cause objectionable increases in the chloride level of the environment surrounding the landfill.

While in accordance with the patent statutes a preferred embodiment and best mode have been presented, the scope of the invention is not limited thereto, but rather is measured by the scope of the attached claims.

What is claimed is:

1. In a batch process for recovering reusable materials from aluminum dross, said dross including fluxing magnesium chloride, and aluminum-containing compounds, and aluminum metal, the process comprising the steps of:

crushing the dross;

treating the crushed dross in a digester vessel with water to dissolve water-soluble compounds contained therein, to produce an aqueous solution of soluble compounds and insolubles, the pH of the solution sometimes having a value different from a desired value;

separating an aqueous solution of the soluble compounds thus obtained from insolubles;

furnacing the insolubles to obtain aluminum metal; and evaporating some of the separated aqueous solution of soluble compounds in an evaporator to crystallize fluxing compounds from evaporator liquor contained in the evaporator, the evaporator liquor having magnesium chloride therein;

the improvement that comprises recycling part of the evaporator liquor back to the digester vessel in an amount sufficient for the magnesium chloride in the evaporator liquor to control the pH of the material in the digester vessel at a desired value and monitoring the pH of the material in the vessel to determine when the desired value has been achieved.

2. The improvement of claim 1 in which the amount of liquor recycled contains a sufficient amount of magnesium compounds to maintain the pH of the digester vessel at no more than about 8.

3. The improvement of claim 1 in which a sufficient further part of the liquor is also withdrawn from the evaporator to control the amount of magnesium compounds therein to a desired concentration.

4. The improvement of claim 3 in which the magnesium compounds contained in said further part are removed from the process.

5. A batch process for recovering reusable materials from aluminum dross, the process comprising the steps of:

crushing the dross;

treating the crushed dross in a digester vessel with water to convert water-soluble compounds contained therein into an aqueous solution of fluxing compound-containing solubles having magnesium chloride therein, and to produce insolubles;

separating an aqueous solution of fluxing compound-containing solubles from insolubles in slurry leaving the digester vessel;

furnacing the insolubles to obtain aluminum metal;

treating the aqueous solution in a crystallizer to crystallize the fluxing compounds from magnesium chloride-containing liquor in the crystallizer, drying the crystallized fluxing compounds in a dryer,
removing a stream of magnesium chloride-containing liquor from the crystallizer, and
recycling said stream to the digester vessel in an amount sufficient to control the pH of the material in the digester vessel at a desired value, and monitoring the pH of the material in the vessel to determine when the desired value has been achieved.

6. A batch process according to claim 5 in which said fluxing compound-containing solubles comprise a mixture of sodium chloride and potassium chloride in substantially equal amounts by weight.

7. A batch process for recovering reusable materials from aluminum dross that includes fluxing, magnesium, and aluminum-containing compounds, and aluminum metal, comprising the steps of:

crushing the dross;
treating the crushed dross in a digester vessel with water to dissolve water-soluble compounds contained therein to produce a slurry containing insolubles and an aqueous solution of fluxing compound-containing solubles having magnesium chloride therein;
separating an aqueous solution of fluxing compound-containing solubles from insolubles in slurry leaving the digester;
furnacing the insolubles to obtain aluminum metal;
treating the aqueous solution in a crystallizer to crystallize the fluxing compounds from liquor contained in the crystallizer, the liquor having magnesium chloride therein;
drying the crystallized fluxing compounds in a dryer,
monitoring the pH of the material in the digester vessel, and
removing two streams of liquor from the crystallizer, and recycling one of the streams to the digester vessel in an amount sufficient for the magnesium chloride to control the pH of the material in the digester vessel at no more than about 8, and feeding the other stream to the dryer.

8. The process of claim 7 in which the amount of the magnesium compounds contained in the two streams is sufficient to prevent the concentration of magnesium compounds in the crystallizer from increasing beyond about 9%.

9. A process according to claim 7 in which said dross includes that obtained from aluminum reclamation processes utilizing aluminum scrap obtained from beverage cans.

10. The process according to claim 7 in which said dross includes that obtained from aluminum reclamation processes utilizing scrap containing above about 1.5% magnesium by weight.

11. The process according to claim 7 in which said fluxing compounds comprise substantially equal amounts, on a weight basis, of sodium chloride and potassium chloride, and said magnesium compound is magnesium chloride.

12. A process according to claim 7 in which the pH is controlled at from about 5 to about 8.

* * * * *